(12) United States Patent
Hilla et al.

(10) Patent No.: US 7,856,512 B2
(45) Date of Patent: Dec. 21, 2010

(54) SYSTEM AND METHOD FOR OFFLOADING A PROCESSOR TASKED WITH CALENDAR PROCESSING

(75) Inventors: Stephen Charles Hilla, Raleigh, NC (US); Barry Scott Burns, Cary, NC (US); Timothy Marsteiner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 855 days.

(21) Appl. No.: 11/213,229

(22) Filed: Aug. 26, 2005

(65) Prior Publication Data

US 2007/0058556 A1    Mar. 15, 2007

(51) Int. Cl.
*G06F 3/00* (2006.01)
*G06F 5/00* (2006.01)

(52) U.S. Cl. ............................. 710/6; 710/51; 710/60; 718/100; 718/104; 718/107; 725/92; 725/93; 725/95

(58) Field of Classification Search ........................ None
See application file for complete search history.

(56) References Cited

U.S. PATENT DOCUMENTS 5,485,212 A * 1/1996 Frederick ............... 375/240.12
5,844,901 A * 12/1998 Holden et al. ............... 370/399
5,926,481 A * 7/1999 Wang et al. .................. 370/465
6,732,199 B1 * 5/2004 Yu et al. ........................ 710/52

* cited by examiner

*Primary Examiner*—Eron J Sorrell
*Assistant Examiner*—Dean Phan
(74) *Attorney, Agent, or Firm*—Stolowitz Ford Cowger LLP

(57) ABSTRACT

The invention comprises system and method for offloading a processor tasked with calendar processing of channel status information. The method comprises multiplexing channel status information received from a plurality of physical interfaces; grouping the channels based on bandwidth; comparing current and previous status information of a group of channels in a first memory; sending current channel status to the processor only if the status of any of the channels in the group has changed; and periodically synchronizing channel status information in the first memory to status information in the processor's memory. The system comprises: multiplexer to combine channel status information received from the interfaces and means for grouping, based on bandwidth, the channels; hardware assist engine to send current channel status to the processor only if channel status has changed; and device to synchronize channel status information in the hardware assist engine to status information in the processor's memory.

14 Claims, 2 Drawing Sheets

SYSTEM AND METHOD FOR OFFLOADING A PROCESSOR TASKED WITH CALENDAR PROCESSING

BACKGROUND OF THE INVENTION

1. Field of the Invention

The invention relates generally to data networking and, more particularly, to a system and method for offloading a processor tasked with processing a regularly scheduled calendar.

2. Description of the Related Art

Effective flow control allows a processor to apply accurate Quality of Service (QoS) policies to the egress traffic. The effectiveness of the flow control determines the acceptable buffering depth of the egress interface. An egress interface can be any type of telecommunications interface that is used for transferring packetized data across a network, such as a Channelized OC-3, Ethernet, OC-12 Packet Over Sonet (POS), etc. Typically, a physical interface may be sub-divided into channels, such as multiple DS0s, DS1s or DS3s in an OC-3 physical interface. The channels may have multiple data buffers for storing packets awaiting to be transmitted over the physical interface. The purpose of having multiple buffers may be for implementing protocols such as Link Fragmentation and Interleaving (LFI) or for different data priority levels.

Ideally, the depth of the egress interface's buffers would be zero, so that the processor managing QoS could select the next packet to be transmitted at the very last moment. Since there is latency associated with sending a packet from the processor to the egress interface, some amount of buffering is required at the egress interface in order to keep the egress interface fully utilized.

A common scheme for reporting buffer status information (i.e., how full the buffer is) uses a calendar mechanism. In a typical, calendar-based reporting system, a serial stream of data is used to report the buffer occupancy status of all the buffers on a particular physical egress interface. The serial stream represents a rotating fixed-length calendar where each bit in the stream represents an event. In this embodiment, the calendar size is 65,535 (64K) event bits in length, which means that every 64K bits in the serial stream the calendar starts over. Each bit in the serial stream that makes up the calendar system is mapped to a specific egress buffer. The value of the status bit specifies whether or not there is room in the egress buffer to receive a block of data. A buffer may have more than one bit assigned to it depending on the rate that the buffer is drained, since the drain rate is proportional to the frequency that the flow control status needs to be reported for it. For instance, an OC-3's buffer may require that it report status twice within one calendar period (the time it takes to transmit the 64K calendar event bits). Therefore, an OC-12's buffer would require that it be reported eight times within a calendar period, because it drains its buffer at four (4) times the rate of an OC-3. The mapping of an egress buffer's status to specific bits within the calendar can be arbitrary. However, they should be equally spaced, so that the reporting points occur at an equal interval with respect to time. For example, the OC-3 interface may report its status at bit time 10 and 32,778, two equal distant points in a 64K calendar.

The processor receives the calendar-based status bits from the egress interfaces and stores them in memory for subsequent use by a traffic manager. The traffic manager in the processor uses the status information to determine whether or not to send a block of data towards that channel/interface.

One way of processing the calendar is to use brute force; that is, dedicate a sizable processor to the task of processing the calendar bit by bit and storing the status information in memory for subsequent use by the traffic manager. However, as the number of egress buffers to be managed grows larger, the frequency that the processor must receive status information increases. Therefore, the load on the processor increases, requiring more resources to be dedicated to processing egress buffer status. The timing of getting the status information for each channel's egress buffers and keeping the appropriate amount of data in each channel's egress buffer to prevent over-runs (loss data) and under-runs (under utilization of physical interface) becomes a daunting task.

Thus, there is a need for a means of reducing the load on a processor tasked with reading a calendar and a means for backing up the processor should it get overwhelmed and drop status information. By offloading the processing of egress buffer status information from the network processor or general processor to a device that is customized for the processing of this information, valuable compute resources remain available to allow for more feature processing to network data. The nature of the calendar-based status reporting system lends itself to a hardware-based solution due to the repetitive nature and well-defined processing requirements. Thus, the invention converts a calendar-based reporting scheme into an event-based reporting scheme, where event-based reporting is deemed to be less compute intensive.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION OF THE EMBODIMENTS

The invention will be described below with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
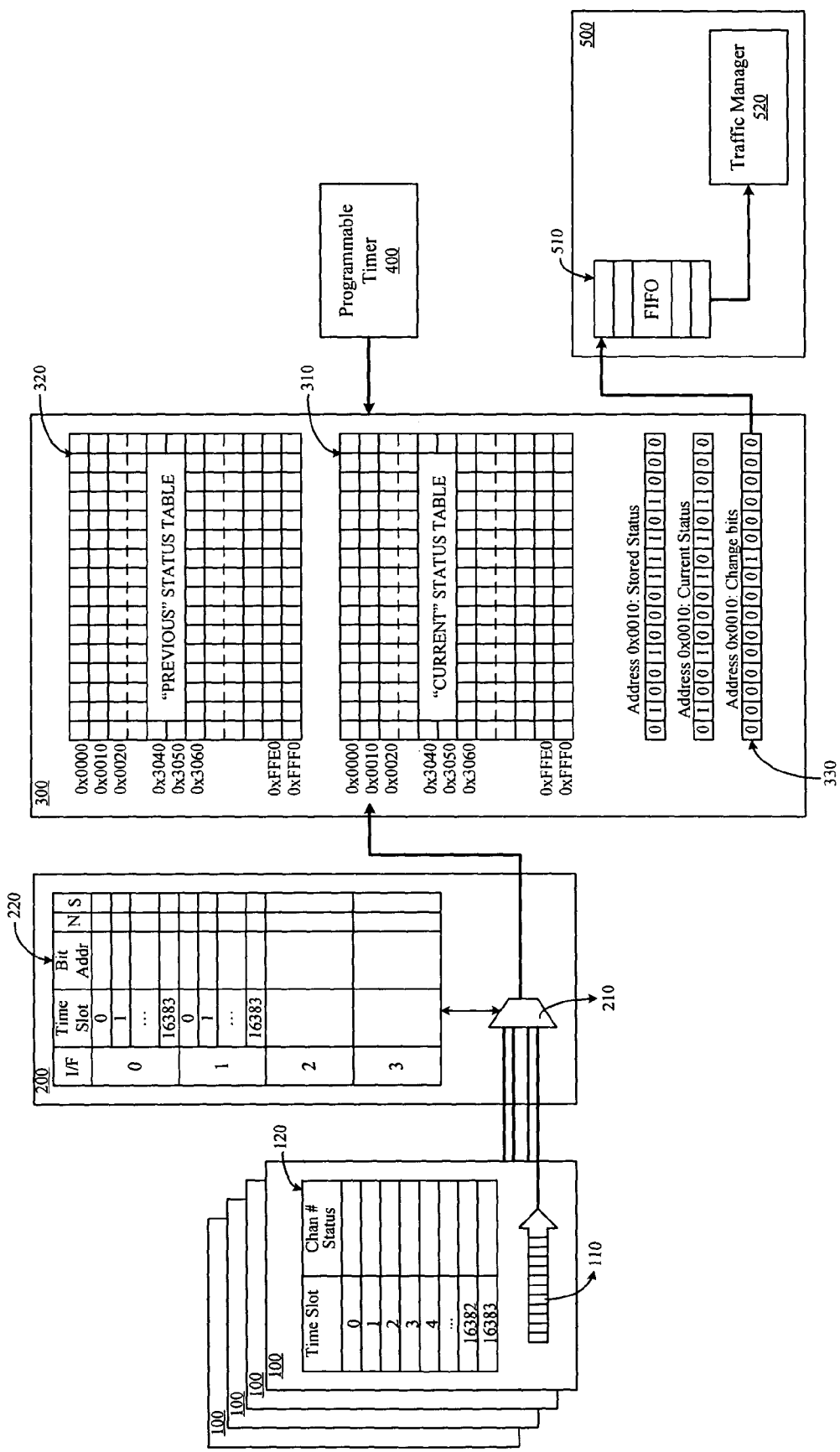
FIG. 1 is a block diagram of the system for offloading a processor tasked with calendar processing.

Referring to FIG. 1, the invention comprises a plurality of physical egress interfaces 100 coupled to a network processor 500. A calendar mechanism 110 is used to report flow control information to the network processor 500. Each physical interface 100, which may be subdivided into channels, uses a map table 120 to link specific channels to time slots in the calendar 110. The flow control status information contained in the calendar 110 from each interface 100 is combined in a multiplexer 210 in a first hardware assist engine 200. In one embodiment, the first hardware assist engine 200 is a Field Programmable Gate Array (FPGA).

The first hardware assist engine 200 collects the flow control information in a calendar map table 220. The calendar map table 220 is closely correlated to the map table 120 in each interface 100 and includes information such as the interface 100 and time slot in the calendar 110 that the flow control information pertains to; and the bit address location in which the flow control status bit (flow bit) will be stored in a second hardware assist engine 300. In one embodiment, the second hardware assist engine 300 is an FPGA.

The second hardware assist engine 300 comprises a "current" status table 310 and a "previous" status table 320. Upon receiving a flow bit from the first hardware assist engine 200, the second hardware assist engine 300 inserts the flow bit into the "current" status table 310. The second hardware assist engine 300 compares the new status with the status last sent to the processor and determines whether or not there is a change. If none of the bits are different, then no status is reported. If one or more bits are different, then status is reported to the network processor 500.

The network processor 500 receives the status information in a status message FIFO 510 for subsequent use by a traffic manager 520. The traffic manager 520 then uses the status information to determine whether or not to send data towards that channel.

The unique methodology for offloading a processor tasked with processing a regularly scheduled calendar is described in further detail below. The invention combines several hardware offload techniques which significantly reduce the load on the processor. The invention further provides a method of backing up the processor should it get overwhelmed and drop status information. The following three offload techniques comprise: (1) channel grouping, (2) event-based reporting, and (3) background updates. The combination of these techniques allows the processor to keep up with the large amount of data and allows for effective flow control in a high channel count traffic shaping scenario.

Figure 2:
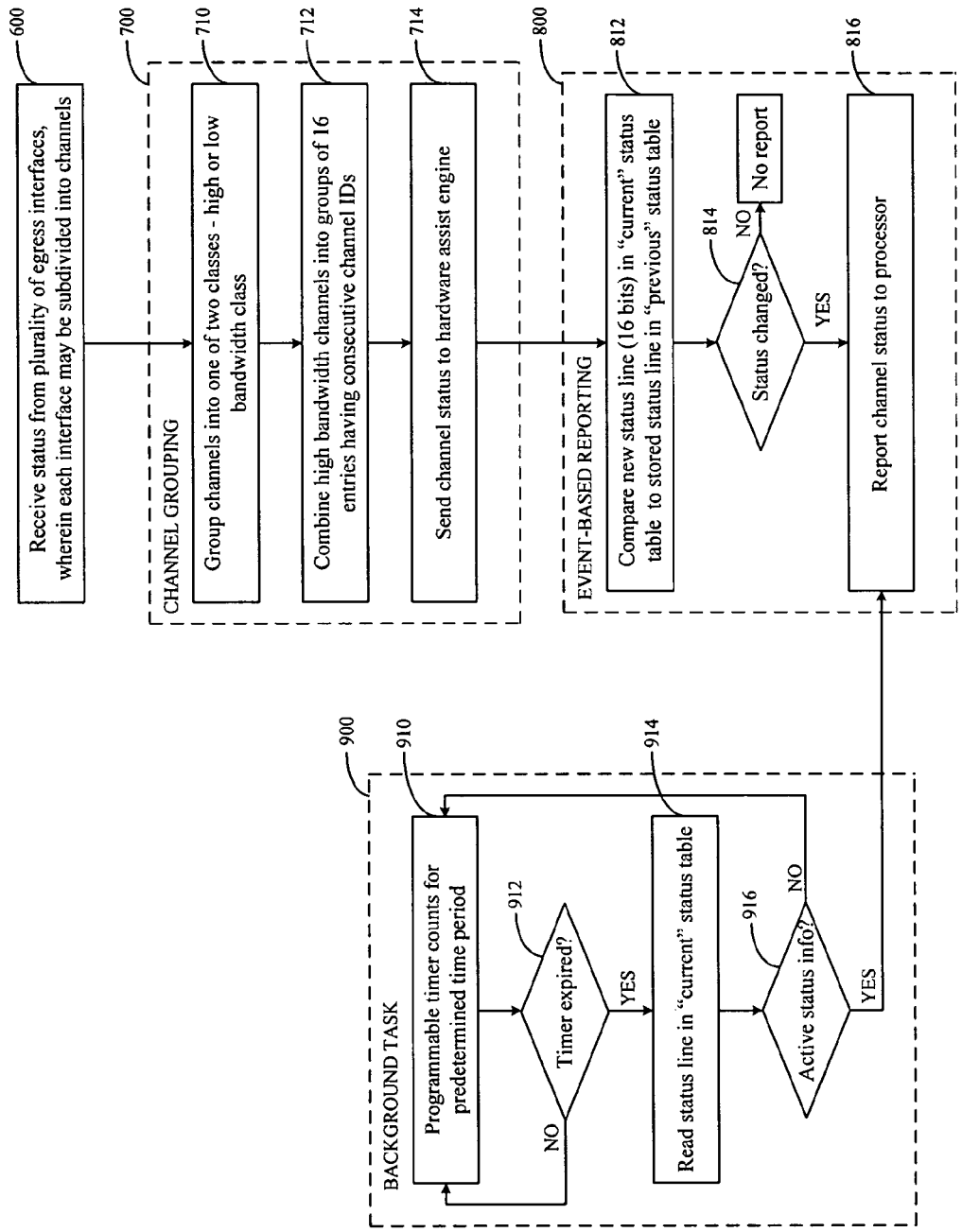
FIG. 2 is a flowchart illustrating the method for offloading a processor tasked with calendar processing.

Referring now to FIG. 2, in block 600, status information is received from a plurality of egress interfaces. In block 700, the first offload technique, channel grouping, is implemented. In block 710, the first hardware assist engine 200 groups the channels into one of two classes, low and high bandwidth classes, based on a channel's bandwidth. For example, a T1 link (1.544 Mb/s) may be in the low bandwidth group, while a 1000 BaseX Gigabit Ethernet link (1 Gb/s) may be in the high bandwidth group. In block 712, the high bandwidth channels are combined into groups of 16 entries. These 16 entries have consecutive channel IDs so they can be reported at the same time with a single base address provided to the processor 500. That is, the high bandwidth channel class is grouped such that the channel numbers assigned are consecutive integers. For example, if there are 12 high bandwidth channels then the channel numbers 0-15 might be allocated to high bandwidth channels and the numbers 16-1023 might be allocated to the low bandwidth channels. Note that channel numbers mentioned above have no correlation with configuration based on physical channel number. These channel numbers are used as a virtual mapping between the calendar-based status reporting system and the event-based reporting system.

In block 714, the first hardware assist engine 200 sends the flow bit information to the second hardware assist engine 300.

Channel grouping is key because the reporting of status for high bandwidth channels is more time critical than that for low bandwidth channels. The primary reason for channel grouping is that the event-based status that is reported to the network processor 500 is performed in groups of 16 channels. If low rate channels were grouped with high rate channels, then the group report frequency would be dictated by the high rate channel. Thus, the low rate channel would be reported at a higher frequency than is required which means that valuable reporting bandwidth is lost. Table 1 below provides some sample values for a 200-byte packet at various interface speeds:

TABLE 1

| Interface | Rate | Bytes/Time slot | # Slots in 200-byte period | Total # Bytes transmitted/Calendar Cycle |
|---|---|---|---|---|
| OC-48 | 2.488 Gbps | 6.0000 | 33.3333 | 98304 |
| OC-12 | 622.08 Mbps | 1.5000 | 133.3333 | 24576 |
| OC-3 | 155.52 Mbps | 0.3875 | 516.1290 | 6348.8 |
| DS3 | 44.736 Mbps | 0.1100 | 1818.1818 | 1802.24 |
| DS1 | 1.544 Mbps | 0.0039 | 51948.0519 | 63.0784 |
| DS0 | 64 Kbps | 0.0002 | 1250000.0000 | 2.62144 |

The "Bytes/Time slot" column in Table 1 specifies the number of bytes that will be transmitted in a single time slot of the calendar. The "# Slots in 200-byte period" column indicates the number of calendar slots that pass during the transmission of a 200-byte packet over the specified interface. A 200-byte packet is a "typical"-sized packet and is used for illustrative purposes only. The "Total # Bytes transmitted/Calendar Cycle" specifies how many bytes are transmitted during one complete cycle through the calendar.

As shown in FIG. 1, each row in the status tables 310, 320 in the second hardware assist engine 300 may represent a rate group; i.e., all channels represented in the row should be the same bandwidth class. For example, DS0s may be grouped together in row address 0x0000, DS1s may be grouped together in row address 0x0010, DS3s may be grouped together in row address 0x0020, etc. The result of the grouping is that the high bandwidth channel status can be reported more often and multiple values can be reported simultaneously. The reporting of a group to the network processor 500 is determined by whether or not at least one of its channels has changed its status since the last reporting period and the groups are scanned at a fixed rate which is the polling period. Thus, if none of the channels within a group have changed their status since the last poll period, then a status message for that group will NOT be sent to the network processor. This provides a level of filtering, so that the network processor 500 does not need to be interrupted for irrelevant information. This is a key advantage to using this method. Also by grouping the status of multiple channels (up to 16, in this embodiment), the processor 500 receives their status simultaneously or in parallel, rather than sequentially and, thus, virtually reducing the polling frequency by a factor of up to 16.

Referring back to FIG. 2, in block 800, the event-based reporting technique is implemented. In a typical calendar system, a processor reads each calendar entry, reads the location in memory allocated to the channel's address, compares the current status bit with the stored status bit, and determines whether or not an update is required. This task puts a constant demand on the processor even when the status is not changing. In an event-based approach, updates are sent to the processor 500 only when there is a status change.

Upon receiving the flow status bit from the first hardware assist engine 200 (block 216), the second hardware assist engine 300 inserts the flow bit into the "current" status table 310. In block 812, the second hardware assist engine 300 compares the new status line in the "current" status table 310 with the stored status line in the "previous" status table 320. In block 814, the second hardware assist engine 300 then determines whether or not there is a change. If none of the bits are different, then no status is reported. If one or more bits are different, then status is reported to the network processor in block 816. For example, as shown in FIG. 1, each of the 16 current status bits in base address 0x0010 is compared to the value stored in the "previous" status table 320 in the second hardware assist engine 300. If none of the bits are different, then no status is reported. If one or more bits are different, then status is reported. A "difference" vector 330 is computed which is a 16-bit vector containing bits set to a "1" value indicating that the bit at that location changed value. The difference vector 330 allows the processor 500 to quickly identify the bits that changed and further reduces the work load. Thus, the use of event-based reporting eliminates the need to interrupt the processor 500 when the status for a given channel has not changed.

In addition to the channel grouping and event-based reporting techniques, background updates of the processor's memory is also used to keep the external memory (i.e., the second hardware assist engine 300) in sync with the processor's memory. A common problem with event-based reporting systems is that events can be lost and, thus, the state of the reporter and the reportee become out of sync with each other. One example of when the processor's state can become out of sync with the external memory is when the processor 500 gets overwhelmed doing other tasks and the status message FIFO 510 fills up, thus causing status messages to get dropped. To avoid this problem, a background task 900 repeatedly walks the external memory table and sends the status for 16 consecutive locations to keep the processor's memory in sync. The rate at which the table is traversed varies for the high bandwidth and low bandwidth groups. For example, a high bandwidth group's status may be reported every 1 µs, while a low bandwidth group's status may be reported every 20 µs. This provides a higher level of synchronization guarantee for channels that require more attention.

Block 900 illustrates the steps in running the background task. In block 910, a programmable timer 400 (FIG. 1) is set to expire after a predetermined time period. When the timer expires in block 912, a status line in the "current" status table is read in block 914. The status line is sent to the processor if and only if the status line contains active status information in block 916. That is, an event-based mechanism is also used when running the background task. Each group of entries in the memory is provided an addition status bit which indicates whether or not there has been activity at that location. If the bit indicates that there is no current activity, then the status of the group of entries does not need to be sent. This feature helps to minimize the number of background task messages when there is a partially populated external status table.

The invention uniquely combines the use of bandwidth classes, event-based reporting, and background synchronization to offload the task of processing the status from a regularly scheduled calendar-based data stream. The combination of channel classes and event-based reported allows status to be reported for groups of channels simultaneously and only when there is new information (that is, status updates are provided rather than simply reporting the status). Prior art uses an event-based approach but would send an individual address and single status bit update per event which can quickly result in an overwhelming number of messages. By grouping events, the invention reduces the load by the size of the status group and, in this embodiment, it is a 16:1 reduction.

Having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention as defined by the appended claims.

What is claimed is:

1. A method for reporting channel status information, comprising:

multiplexing channel status information received from a plurality of physical interfaces subdivided into a plurality of channels;

combining the plurality of channels into a group selected from a plurality of groups comprising associated pluralities of channels grouped according to bandwidth classes, each of the plurality of groups having a predetermined number of channels, wherein each channel corresponds to a memory location in a first memory;

wherein a first memory location is configured to store new independent status bits for each of the channels of the group;

wherein a second memory location is configured to store previously received independent status bits for each of the channels of the group;

wherein a third memory location is configured to store a group status;

upon receiving and storing new independent status bits corresponding to the channels of the group, comparing the new independent status bits with corresponding previously received independent status bits;

wherein if the new independent status bits match all the corresponding previously received independent status bits, then inferring that the group status did not change and deferring sending a status report to a network processor, else, if any of the new independent status bits is different from a corresponding bit in the previously received independent status bits, then inferring that the group status did change and sending the status report to the network processor; and periodically executing a background task to synchronize current channel status information for each of the channels of the plurality of groups in the first memory to current channel status information for each of the channels of the plurality of groups located in a second memory in the network processor.

2. The method of claim 1, further comprising:

mapping the channel status information into the current channel status information in the first memory.

3. A readable storage media containing instructions that, when executed, cause a machine to:

multiplex channel status information received from a plurality of physical interfaces subdivided into a plurality of channels;

combine the plurality of channels into a group having a predetermined number of channels, wherein the combining is based on bandwidth;

associate a current group status with a first location in a first memory;

associate a previous group status with a second location in the first memory;

associate a change group status with a third location in the first memory;

wherein the channel status information comprises current and previous independent status bits corresponding to each channel of the group;

receive and store current independent status bits for all channels of the group in the first location in the first memory, the current independent status bits indicating channel status for each channel of the group;

store previous independent status bits in the second location in the first memory, the previous independent status bits indicating a previous channel status for each channel of the group;

for each channel of the group, compare each of the current independent status bits to a corresponding bit of the previous independent status bits;

determine the current group status, wherein if any of the current independent status bits is different than the corresponding bit of the previous independent status bits, then determining that the current group status has changed, else, if each of the current independent status bits match the corresponding bit of the previous independent status bits then determine that the current group status has not changed;

for each channel of the group, indicate a change based on the determination that the current independent status bits is different than the corresponding bit of the previous independent status bits in the third location in the first memory;

report the current independent bits including all of the channel status information of the group of channels to a second memory in a network processor only if the change is indicated in the third location in the first memory; and periodically execute a background task to synchronize the channel status information for each channel in the first memory to channel status information in the second memory in the network processor.

4. The readable storage media of claim 3, wherein the first location comprises a current status table comprising a first plurality of status lines, each status line comprising current channel status information for each channel in the group of channels, wherein the second location comprises a previous status table comprising a second plurality of status lines, each status line comprising previous channel status information for each channel in the group of channels.

5. The readable storage media of claim 4, containing instructions that, when executed, further cause the machine to:

map the current and previous channel status information into a corresponding current and previous status table in the first memory;

wherein comparing the current channel status information to the previous channel status information comprises comparing one of the first plurality of status lines in the current status table to one of the second plurality of status lines in the previous status table.

6. The readable storage media of claim 5, wherein periodically synchronizing the channel status information comprises:

according to predetermined time periods, read a next status line in the current status table in the first memory; and send the next status line in the current status table to the network processor only if the next status line indicates activity in any channel of the group of channels.

7. The method of claim 1, wherein the channel status information for channels with high bandwidth classes are reported to the network processor at a higher frequency rate than the channel status information for channels with low bandwidth classes.

8. A system for reporting channel status information, comprising:

means for multiplexing channel status information received from a plurality of physical interfaces subdivided into a plurality of channels;

means for combining the plurality of channels into a group selected from a plurality of groups comprising associated pluralities of channels grouped according to bandwidth classes, each of the plurality of groups having a predetermined number of channels, wherein each channel corresponds to a memory location in a first memory;

wherein the first memory location is configured to store new independent status bits for each of the plurality of channels of the group;

wherein a second memory location is configured to store previously received independent status bits for each of the plurality of channels of the group;

wherein a third memory location is configured to store a group status;

means for comparing the new independent status bits with corresponding previously received independent status bits upon receiving and storing new independent status bits corresponding to the plurality of channels of the group;

wherein if any of the new independent status bits matches a corresponding bit in the previously received independent status bits, then inferring that the group status did not change and deferring reporting to a network processor, else, if any of the new independent status bits is different from the corresponding previously received independent status bit, then inferring that the group status did change and sending the status report to the network processor; and means for periodically executing a background task to synchronize current channel status information for each of the plurality of channels of the plurality of groups in the first memory to current channel status information for each of the plurality of channels of the plurality of groups located in a second memory in the network processor.

9. An apparatus comprising:

a first hardware assist engine, comprising a multiplexer to combine channel status information received from a plurality of interfaces subdivided into a plurality of channels, and configured to combine, based on bandwidth, the plurality of channels into a plurality of groups, each one of the groups having a predetermined number of the channels, wherein the channel status information comprises current and previously received independent status bits corresponding to each channel of a group of the plurality of groups;

a second hardware assist engine comprising a processor to:

associate a current group status with a current status table in a first memory;

associate a previous group status with a previous status table in the first memory;

associate a change group status with a group status table in the first memory; and store previously received independent status bits indicating a previous status for each channel of the group in the previous status table;

a receiver to receive current independent status bits for all channels of the group, the current independent status bits to be stored in the current status table and indicating channel status for each channel of the group;

a comparator to determine whether any entry of a particular one of a first plurality of status lines in the current status table matches a corresponding entry in one of a second plurality of status lines in the previous status table, wherein the first plurality of status lines comprise a current version of the channel status information for the channels of the group;

a transmitter configured to report the status of the group to a network processor, if the comparator determines that any two corresponding entries corresponding to any channel of the group do not match; and a device to execute a background task to synchronize the channel status information in current status table to channel status information in a second memory in the network processor.

10. The apparatus of claim 9, wherein the device comprises:

a programmable timer to set a predetermined time period, the programmable timer configured to read a first one of the first plurality of status lines in the current status table when the programmable timer expires; and configured to send the first status line in the current status table only if current activity is indicated in the first status line.

11. The system of claim 8 further comprising a means for buffering status messages.

12. A method comprising:

receiving, from each of a plurality of physical interfaces, respective calendar-based channel status information, each of the physical interfaces subdivided into a plurality of respective channels, each of the respective channels of each of the physical interfaces associated with one or more time slots in the respective calendar-based channel status information of a physical interface of the plurality of physical interfaces, associated one or more time slots providing respective channel status information of the respective channel;

mapping, for each of the physical interfaces, each of the time slots in the respective calendar-based channel status information to a respective bit location in a current status table in a first memory, each of the channels corresponding to one of the bit locations;

grouping the channels into groups according to bandwidth classes, at least some of the groups having two or more of the channels, and wherein, for each of the groups, a current version of the respective channel status information of the channels of the group is configured to be accessed simultaneously in the current status table in the first memory via a respective base address of the group;

for each channel of a group, comparing, for each of the groups, the current version of the respective channel status information for the channels of the group with a previous version of the respective channel status information for the channels of the group;

determining a current group status for each of the groups, wherein for a particular group if any current channel status information is different than the previous version of the respective channel status information, then determining that the current group status of the particular group has changed from a previous status, else, if all of the current channel status information is not different than the previous version of the respective channel status information, then determine that the current group status of the particular group has not changed for the particular group; and in response to the comparing, for each of the groups, selectively sending a group status update to a network processor, only if the current group status has changed from the previous status;

periodically execute a background task to synchronize, for each of the groups, the current version of the respective channel status information of the channels of the group to a memory of the network processor 13. The method of claim 12, further comprising:

inserting in the current status table, for each of the channels, the respective channel status information according to a corresponding bit location.

14. The method of claim 12, wherein the current group status is a difference vector between the current channel status information of the channels of the group and the previous version of the respective channel status information of the channels of the group.

* * * * *

UNITED STATES PATENT AND TRADEMARK OFFICE
CERTIFICATE OF CORRECTION

| | | |
|---|---|---|
| PATENT NO. | : 7,856,512 B2 | Page 1 of 1 |
| APPLICATION NO. | : 11/213229 | |
| DATED | : December 21, 2010 | |
| INVENTOR(S) | : Hilla et al. | |

It is certified that error appears in the above-identified patent and that said Letters Patent is hereby corrected as shown below:

At column 10, line 29, please replace "processor" with --processor.--.

Signed and Sealed this
Fourth Day of October, 2011

David J. Kappos
*Director of the United States Patent and Trademark Office*